Patented Oct. 12, 1943

UNITED STATES PATENT OFFICE 2,331,448

CHEMICAL PROCESS

Carl Winning, Union, and Louis A. Mikeska, Westfield, N. J., assignors to Standard Oil Development Company, a corporation of Delaware No Drawing. Application October 5, 1940, Serial No. 359,904

5 Claims. (Cl. 260—609)

This invention relates to an improved process for preparing metal aroxides which is especially advantageous for the preparation of derivatives of substituted phenols and weakly basic metal compounds, which are effective detergents and improving agents for hydrocarbon lubricating oils.

The invention relates more particularly to the production of metal aroxides by reacting a weakly basic metal compound with a hydroxy aryl compound under such conditions that water is removed from the zone of reaction as it is formed, thereby avoiding overheating of the reagents and securing a smooth, readily controlled reaction and the formation of the desired metal aroxides in a form especially suited for addition to hydrocarbon oils as improving agents therefor.

It is known that aqueous solutions of alkali metal aroxides may be prepared by the reaction of the phenol with an alkali metal base, such as sodium hydroxide, in the presence of water. When this reaction is attempted with weak bases of the polyvalent metals, very low yields, if any, of the desired products are obtained, and further difficulties are encountered in the necessity of rendering the metal phenolates anhydrous and of sufficient purity for use. These disadvantages are especially pronounced with the more weakly acidic hydroxy aryl derivatives, such as the higher alkylated phenols, the alkylated hydroxy aryl sulfides and the like.

It has now been found that high yields of the metal aroxides may be obtained and these disadvantages avoided by conducting the reaction of the hydroxy aryl compound and the metal base in a liquid vehicle which boils at or above the reaction temperature and removing water of reaction as it is formed, thereby obtaining a solution of the desired products which is of high purity and ready for immediate use.

The following examples are presented to illustrate suitable methods for carrying out the process of this invention.

Example 1

110 grams of para-tertiary amyl-hydroxyphenyl sulfide,

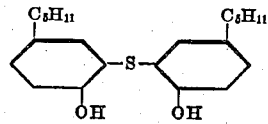

were dissolved in 200 cc. of xylol. 17 grams of calcium oxide and 20 cc. of water were added to this solution. The mixture was then heated with rapid stirring to boiling under a reflux condenser provided with a trap for removing water from the reflux condensate. As the xylol distilled, it carried with it the water which had been added to the reaction mixture as well as water which was formed as a result of the reaction. The water was caught in a trap and withdrawn while the refluxed xylol was returned to the reaction mixture, the refluxing being continued until no more water was obtained. The distillation was then discontinued and the solution was filtered to remove a trace of undissolved calcium oxide. On evaporation of the filtrate a light yellow pulverizable salt was obtained in a yield of 122 grams. This was the calcium salt of para-tertiary amyl-hydroxyphenyl sulfide. It was found to be soluble in naphtha and in petroleum lubricating oils.

Example 2

$\frac{1}{5}$ gram mol (46.8 grams) of ortho para di-tertiary amyl phenol was added to 33 grams (0.1 mol=31.6 grams) of barium hydroxide octahydrate, $Ba(OH)_2.8H_2O$, in 300 cc. of absolute ethyl alcohol. The alcohol solution was refluxed for one hour and the alcohol then distilled off. The residue was taken up in benzene and unreacted barium hydroxide filtered off. Benzene was stripped from the filtrate, the last traces being removed under vacuum. The residue was the barium salt of di-tertiary amyl phenol, which may otherwise be called barium di-tertiary amyl phenolate. The yield was practically quantitative and the product was readily soluble in mineral lubricating oil, for instance, in a naphthenic base Diesel oil having a viscosity of about 55 seconds Saybolt at 210° F.

Example 3

Two mols (414 g.) of di-isobutyl phenol were dissolved in 3 liters of pure benzene, and one mol (315 g.) of barium hydroxide octahydrate, $Ba(OH)_2.8H_2O$, added. The mixture was refluxed for several hours in a flask fitted with a condenser having a trap for removal of condensed water. During this operation 176 cc. of water were removed; the theoretical amount of water formed should have been 180 g. The reaction mixture was filtered and the filter residue added to hot benzene and refiltered. The two filtrates were combined and the solvent removed, yielding 530 grams of the barium salt of di-isobutyl phenol, or 97% of the theoretical yield of 549 grams.

| Analysis | Found | Calculated |
|---|---|---|
| Per cent barium | 23.2 | 25.0 |

Example 4

Di-isobutyl-hydroxyphenyl sulfide (bis-tetramethyl butyl hydroxyphenyl sulfide) was prepared by reacting 2 mols of di-isobutylphenol with 1.5 mols of sulfur dichloride in chloroform solution at a temperature of 25° C., raising the temperature to the boiling point to complete the reaction and to remove hydrogen chloride. The resulting di-isobutyl-hydroxyphenyl sulfide was found to contain 1.3 atoms of sulfur per molclue.

In view of this sulfur content, the molecular weight of the sulfide was assumed to be 452, rather than the theoretical molecular weight of 442 for a compound having 1 atom of sulfur per molecule.

One mol (452 grams) of this di-isobutyl-hydroxyphenyl sulfide, dissolved in 2000 grams of chloroform, was placed in a flask fitted with a trap and reflux condenser so that water formed during reaction could be removed from the lower chloroform layer. 332 grams of $Ba(OH)_2.8H_2O$ (representing one mol+a 5% excess) were added to the chloroform solution of the sulfide in four approximately equal portions. After each addition of $Ba(OH)_2.8H_2O$, the mixture was refluxed and water released was removed through the trap. When no further water was removed, another portion of $Ba(OH)_2.8H_2O$ was added. Following addition of the last $Ba(OH)_2.8H_2O$ the solution was refluxed for 30 hours until the last traces of water were removed.

Amount of water removed=181 cc. Theoretical amount of water formed in the reaction of one mol of $Ba(OH)_2.8H_2O$ with one mol of di-isobutyl-hydroxyphenyl sulfide to form one mol of the barium salt=180 cc.

Following complete removal of the water, the chloroform solution of the barium salt of di-isobutyl-hydroxyphenyl sulfide was filtered to remove traces of barium carbonate, barium oxide and unreacted barium hydroxide remaining after the reaction. Amount of chloroform insoluble inorganic salt filtered off=19 grams.

The chloroform solution was evaporated to dryness and the barium salt recovered as a brownish-yellow solid. A theoretical yield was obtained.

| Analysis | Found | Calculated |
|---|---|---|
| Per cent barium | 22.3 | 23.3 |

The present invention may be used to prepare metal aroxides from phenols and both cyclic and aliphatic derivatives thereof, such as cyclohexyl phenol and other cyclo alkyl and naphthyl phenols, phenyl phenol and other aryl phenols, phenolic compounds having condensed nuclei such as naphthol and the like, alkylated phenolic compounds such as the cresols and higher alkylated derivatives containing one or more alkyl groups of one or more carbon atoms each attached to the aromatic nucleus. Other derivatives of all such phenolic compounds may also be used in which other substituent groups may be attached to the aromatic nucleus such as chlorine and other halogens, also amino groups, particularly hydrocarbon substituted amino groups such as dimethyl amine and the like, also oxygen, sulfur, selenium or tellurium. The process is especially applicable to the preparation of metal derivatives from thiophenols, and the thioethers and disulfides of the above described phenolic compounds and derivatives thereof. Particularly suitable examples thereof are the alkyl hydroxy aryl sulfides (thioethers, disulfides, etc.) having an alkyl group of at least 4 and preferably less than about 13 carbon atoms attached to the aryl ring, such as tertiary butyl hydroxyphenyl thioether, secondary amyl hydroxyphenyl disulfide, di-isobutyl-hydroxyphenyl sulfide, and the like. The alkyl and polyalkyl phenols may be synthesized conveniently by alkylating a phenol with one or more olefins, especially the branched chain olefin polymers such as diisobutylene, triisobutylene, ditertiary-amylene or with other suitable agents such as isobutylene, trimethyl ethylene, cyclohexene, hexene-2, alcohols, alkyl sulfates, alkyl phosphates or alkyl halides, thereby forming carbon to carbon bonds between the aromatic nucleus and the alkyl group.

Phenolic compounds obtained from petroleum sources are also useful for the present process and are considered to contain polymethylene or cycloalkyl side chains as evidenced by their hydrogen and carbon analysis. The petroleum phenols may be obtained by extraction of various stocks, chiefly heating oil stocks obtained by cracking of heavier oils, with caustic soda and acidification of the alkaline extract with a weak mineral acid followed by a non-destructive distillation, if desired, of the organic products. By using the above described methods or other suitable methods for preparing alkyl phenols, the following alkylated phenols, especially suitable for use in the process of this invention, may be obtained; tertiary amyl phenols, isohexyl phenol, diisobutyl phenol (tetramethyl butyl phenol), ditertiary butyl phenol, octyl phenol, etc.

Inorganic derivatives of the phenols are also suitable for use in the present invention and may be produced by various methods. Inorganic substituents may be introduced into the alkyl phenols, for example, an alkyl phenol such as tertiary amyl phenol may be reacted with sulfur monochloride, $S_2Cl_2$, in about a 2/1 to 2/2 mol ratio and in a solvent such as dichlorethane or chloroform, to produce the corresponding alkyl hydroxyphenyl disulfide. Using substantially the same procedure but substituting sulfur dichloride, $SCl_2$, for the monochloride, the corresponding alkyl hydroxyphenyl thioether is obtained. Suitable processes for conducting this reaction are described in U. S. Patent 2,139,321. Alkyl chlor phenols are obtained by chlorination preferably controlled to replace nuclear hydrogen by chlorine. This may be accomplished by chlorinating the phenol before alkylation. In such a manner, for example, 2-chlor-4-tertiary amyl phenol can be obtained. Nitro substituents are introduced readily into the aromatic nucleus by direct nitration and the nitro substituents may be reduced to amino groups. It is to be understood, however, that the preparation of substituted phenolic compounds which have been described above does not form part of this invention and that any of the well known methods for their production may be used, all such compounds forming suitable materials for the preparation of metal phenolates by the process of this invention.

This process also lends itself particularly well to the preparation of salts of mixed compounds, such as the half esters with phosphorous obtained on reacting a bis hydroxy aryl sulfide with phosphorous trichloride:

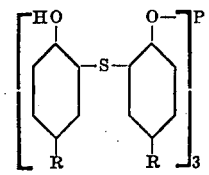

in which R represents an alkyl group or hydrogen.

The resulting metallic compounds may be represented by the general formula $M_a[ORO]_bX_c$ where M represents a metal, R is an aryl or a substituted aryl radical as described above, X is an acid residue, and $a$, $b$ and $c$ are integers representing the respective equivalents of M, ORO, and X required to satisfy all valences. Obviously all valences of M and X need not be joined to ORO, thus it is possible to prepare compounds of the type

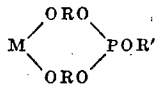

where R is an aryl or substituted aryl radical and R' is the same or a different organic radical.

While the process of this invention has been illustrated in the above examples only with oxides and hydroxides of calcium and barium, this process may also be conducted with other mildly basic acting metal compounds, hydrated or anhydrous, such as the oxides, hydroxides and carbonates of the polyvalent metals. The invention is especially advantageous in the preparation of metal aroxides of the alkaline earth metals and of the substituted phenols such as the alkyl phenols and hydroxyphenyl sulfides, as it has been found, that these are not formed to any satisfactory extent when the reaction is conducted in aqueous media.

Organic liquid media suitable for use in this invention are those which have boiling points preferably above about 80° C. or, if more volatile, form constant boiling mixtures with water and thereby aid in the removal of water. Examples of such liquids are the alcohols, especially ethyl and isopropyl alcohol, hydrocarbons such as benzol, toluol, solvent naphtha and the like, and also hydrocarbon halides such as dichlorethane and the like. These liquids should be substantially inert, or at least should react only very slowly with any of the reagents and reaction products under the conditions of the reaction. The hydrocarbons, alcohols, ethers, ketones, esters, and the saturated alkyl halides boiling between about 100 and 150° C. are preferred media for the process of this invention. Liquids of even higher boiling points may be used, such as heavy naphtha and the gas oil and lubricating oil fractions of petroleum which have preferably been refined by treatment with fuming sulfuric acid to the extent that they are substantially inert in the process of this invention. When using liquids that have boiling points substantially above 100° C., the process may also be conducted at a temperature below the boiling point of the liquid, provided it is above about 100° C. In such cases it is generally advantageous to aid the removal of water by passing an inert gas such as nitrogen through the liquid solution or suspension of reagents until the reaction is substantially completed, or at least during the latter stages of the reaction. The organic liquid vehicles used in the process of this invention are preferably solvents for at least a portion of the hydroxy aryl reagent and the reaction product, but organic liquid vehicles that serve primarily as thinning agents in which the reagents and the reaction products are suspended, may also be used.

In the event that it is desired to employ the finished metal compound in some mixture, the other components of the mixture, if adequately inert, may be added before all the volatile organic liquid vehicle has been distilled off, or even before the water of reaction has been removed. For example, if the metal compound is to be used as a lubricating oil additive, it is often convenient to add a sufficient amount of a suitable mineral oil to the reaction mixture so that, when evaporation of the volatile organic vehicle has been completed, the desired metal compound will be recovered as a concentrate in the oil. The mineral oil can in such a process be added even at the start of the reaction and thus reduce the quantity of the volatile organic vehicle or solvent to that required to permit ready reaction.

The U. S. Patent 2,139,321 also describes a process for the production of hydroxy aryl sulfides by reaction of phenol with a sulfur halide in the presence of numerous solvents, thereby obtaining a solution of the hydroxy aryl sulfide in such solvents as the products of the reaction. This solution may be used directly for the preparation of metal aroxides, by adding thereto a basic compound of the desired metal and heating the resulting mixture under reflux while trapping out of the reflux condensate the water formed in the reaction.

While the process of the present invention may be conducted at any suitable temperature below a temperature causing decomposition of the reagents or the reaction products and effective in driving off the water formed in the reaction, it is usually conducted at temperatures above about 80° C. and below about 200° C., temperatures between 100 and 150° C. being preferred.

This invention is not to be limited by any examples or theoretical explanations presented herein, all being intended solely for purpose of illustration, as it is intended to claim this invention as broadly as the prior art permits.

We claim:

1. A process for preparing an alkaline earth metal phenoxide of an alkyl phenol sulfide which comprises refluxing a mixture of about one molecular proportion of an alkyl phenol sulfide and about one-half molecular proportion of a member of the class consisting of the alkaline earth metal oxides and hydroxides, in the presence of an organic solvent selected from the group consisting of benzene, toluene, and xylene, and separating and withdrawing water from the refluxing solvent, said refluxing being continued until water is no longer present in the refluxant.

2. A process according to claim 1 in which the alkaline earth metal compound is an oxide of calcium.

3. A process according to claim 1 in which the alkaline earth metal compound is an oxide of barium.

4. A process according to claim 1 in which each alkyl group present in the alkyl phenol sulfide contains at least 4 carbon atoms.

5. A process for preparing a calcium phenoxide of para tertiary amyl hydroxy phenyl sulfide which comprises refluxing a mixture of about one molecular proportion of para tertiary amyl hydroxy phenyl sulfide and about one-half molecular proportion of calcium oxide in the presence of xylol, and separating and withdrawing water from the refluxing xylol, said refluxing being continued until water is no longer present in the refluxant.

CARL WINNING.
LOUIS A. MIKESKA.